United States Patent [19]

Arnold et al.

[11] 3,854,951

[45] Dec. 17, 1974

[54] METHOD FOR MAKING A RADIATION SENSITIVE RECORDING MATERIAL CONTAINING A SPIROPYRAN COMPOUND, AN HX-DONOR A BINDER, AND ETHYL ACETATE AS SOLVENT

[75] Inventors: Günther Arnold; Hans-Peter Vollmer, both of Ulm/Donau, Germany

[73] Assignee: Lincentia Patent-Verwaltungs G.m.b.H., Frankfurt am Main, Germany

[22] Filed: Mar. 17, 1972

[21] Appl. No.: 235,792

[30] Foreign Application Priority Data
Mar. 17, 1971 Germany............................ 2112836

[52] U.S. Cl. .............................................. 96/90 PC
[51] Int. Cl............................................... G03c 1/52
[58] Field of Search.......... 96/90 R, 90 PC; 252/300

[56] References Cited
UNITED STATES PATENTS
3,528,926 9/1970 Voorhis et al. .................... 96/90 PC 3,667,949 6/1972 Inoue et al........................ 96/90 PC FOREIGN PATENTS OR APPLICATIONS
1,274,655 8/1968 Germany ......................... 96/90 PC
755,799 2/1971 Belgium ........................... 96/90 PC Primary Examiner—David Klein
Assistant Examiner—Won H. Louie, Jr.
Attorney, Agent, or Firm—Spencer & Kaye

[57] ABSTRACT

A method for making a radiation sensitive recording material from a spiropyran compound, an HX-donor for giving off HX when irradiated by light of predetermined energy, X indicating a halogen atom, and a matrix along with a solvent for providing a distribution of the spiropyran compound and HX-donor, the method being characterized by the adding in said matrix or said solvent means of an ester for reducing the spirain fraction of the spiropyran compound.

4 Claims, No Drawings

METHOD FOR MAKING A RADIATION SENSITIVE RECORDING MATERIAL CONTAINING A SPIROPYRAN COMPOUND, AN HX-DONOR A BINDER, AND ETHYL ACETATE AS SOLVENT

BACKGROUND OF THE INVENTION

The present invention relates to a method for making a radiation sensitive recording material from a spiropyran compound, an HX-donor, and possibly sensitizers and binders, along with a solvent.

For purposes of information recording in optical data storage equipment, it has already been proposed to utilize for the radiation sensitive recording materials the color changes which spiropyran compounds undergo when exposed to high energy radiation. The stability of the color-changed spiropyran compounds and the radiation sensitivity of the recording material may be improved by the addition of radical or acid forming substances. See U.S. Patent application Ser. No. 74,198, filed September 21, 1970, by Günther Arnold et al. for a "Storage Material" and West German Auslegeschrift (Published Application) No. 1,274,655.

High energy radiation having a predetermined wavelength $\lambda_1$ lying, for example, in the ultraviolet range is used to record information. It is absorbed in recording material containing radical or acid forming substances, i.e. HX-donors, preferably by the HX-donor. Because of this energy absorption, a chemical conversion of the HX-donor takes place and the product HX of this conversion forms a stable color salt with the spiropyran compound. Thus, a new absorption maximum of wavelength $\lambda_2$ is produced. This absorption maximum may, for example, lie in the visible range.

Information recorded in this manner can be read out with a reading beam of wavelength $\lambda_2 > \lambda_1$. However, a very slight absorption of this reading beam generally occurs also outside of the areas previously struck by the write-in radiation $\lambda_1$. This causes, in the case of irradiation of long duration or in the case of very frequent readouts, color change to occur in areas that were not struck by the write-in radiation. This effect can be very troublesome, particularly in the case of high information densities. The resulting reduction of contrast can lead to the loss of part of the information recorded.

SUMMARY OF THE INVENTION

An object of the present invention, therefore, is to provide a method for making a radiation sensitive recording material distinguished by an exceptional stability with respect to readout radiation.

This as well as other objects will become apparent in the discussion that follows are achieved, according to the present invention, by a method for making a radiation sensitive recording material from a spiropyran compound, an HX-donor means for giving off HX when irradiated by light of predetermined energy, X indicating a halogen atom, and a matrix along with a solvent for providing a distribution of the spiropyran compound and HX-donor means, comprising adding in said matrix or said solvent an ester means for reducing the spirain fraction of the spiropyran compound.

The ester means in said solvent consisting of a compound within the formula $$R\ COOR'$$

where R, R' represents substituted or unsubstituted linear or branched alkylradicals containing 1 – 10 C atoms.

The ester means in said matrix consisting of a compound within the formula $$-R''COOR'$$

where R', R'' represent substituted or unsubstituted linear or branched alkylradicals containing 1 – 10 C atoms or substituted or unsubstituted arylrests.

DESCRIPTION OF THE PREFERRED EMBODIMENTS

A very small fraction of a spiropyran compound provided as the color-changing substance of a recording material is in the open, or spirain, form, while the remainder of the compound is in the closed form. The relative proportions of open and closed compound is given by the mass action law for any given temperature. The closed form of a spiropyran is shown by structural formula 1 in U.S. Pat. No. 3,486,899, issued Dec. 30, 1969, to Harvey A. Brown for an "Imagewise Photochromic Responsive Element and Process", while the corresponding open, or spirain, form is illustrated at column 2, line 45, of that patent.

The troublesome absorption, mentioned above in the BACKGROUND OF THE INVENTION, of readout radiation in areas of a recording material not previously struck by write-in radiation is caused by an absorption band of the spirain fraction of the spiropyran compound being used for the recording material. This absorption band can lie in the immediate vicinity of the absorption band of the color salt.

There is always an equilibrium between the closed and the spirain forms of the spiropyran compound. For a given temperature, this equilibrium depends only on the interaction of the spiropyran compound with the surrounding substances, these being the HX-donor, possibly sensitizer and binder, and solvent.

The absorption by the spirain fraction is reduced by an ester compound in the binder and/or solvent of the recording material. Thus, with suitable selection of the binder or solvent, the formation of the spirain form of the spiropyran compound can be substantially suppressed in favor of the closed form.

It is preferred to use at least 10 mols of "ester groups" of binder or solvent per mol of HX-donor.

The reduction of the spirain concentration can be effected either by the action of individual substances in the recording material or in the solvent or by the coaction of a plurality of such substances. For example, the use of a binder containing an ester can assure that only a neglibily small fraction of the spiropyran compound changes into the spirain form.

The selection of a binder, however, generally depends on the choice of HX-donor, because the coaction of the binder and donor is important. See the above-mentioned U.S. Patent application Ser. No. 74,198; the binder is referred to in that application as a film-forming means.

A preferred combination of HX-donor and binder is 2,2,2-tribromoethanol and polymethylmethacrylate(-Plexiglas). Moreover, improvement of the readout light stability can be attained by individual solvent components or by the solvent itself with which the individual substances contained in the recording material are homogeneously distributed.

The following recording material composition has an improved stability:

$2 \times 10^{-2}$ mols/liter 3'-n-amyl-7'-methoxy-spiro[3H-naptho(2.1-b)pyran-3,2'-2H-benzo(1)pyran] as spiropyran compound, $10^{-1}$ mols/liter 2,2,2-tribromoethanol as HX donor, 5% by weight Plexiglas as binder, and, as solvent, 3 parts by volume chloroform and 1 part by volume dichloromethane.

The absorption of readout light by this recording material is further reduced by substituting for the 3 parts chloroform, 1 part dichloromethane solvent the following solvent composition:

2 parts by volume chloroform,
1 part by volume dichloromethane, and
1 part by volume of the ethyl ester of acetic acid.

Wavelength for recording $\lambda_1 = 257$nm
Wavelength for reading $\lambda_2 = 546/578$nm The improvement for this recording material will be better than 50 %.

However, the final matrix means providing a homogeneous distribution of spiropyran compound and HX-donor may be only binder, such as would be the case when using the type of technology represented by the above-mentioned U.S. Patent application Ser. No. 74,198. In this case, recording material solution is applied to a transparent substrate and solvent is rapidly evaporated to provide a film on the substrate. The equilibrium of the solution between the closed and open spiropyran forms is then frozen and maintained in the film on the substrate.

According to the West German Offenlegungsschrift 1,947,715 substances containing ester groups are used as a matrix material or as component of a matrix material. Definitely for this purpose the use of esters, for example of polymethylmethacrylate or ethyl ester of acetic acid or combinations of these substances are well known.

In combination with a spiro-compound and a HX-donor according to the present invention the photochromic properties of the recording material will be changed by reducing the spirain concentration in favour of the spiropyran concentration. This effect will preferably be used to compensate or eliminate the contrary effect, caused for example by the HX-donor. If for example 2,2,2 tribromoethanol is used as HX-donor this contrary effect is eliminated by H bonding of the hydroxy group of the HX-donor to the carbonyl group of the ester.

It will be understood that the above description of the present invention is susceptible to various modifications, changes and adaptations, and the same are intended to be comprehended within the meaning and range of equivalents of the appended claims.

We claim:

1. In a method for making a radiation-sensitive recording material from a spiropyran compound, an HX-donor for giving off HX when irradiated by light of predetermined energy, X indicating a halogen atom, and a binder therefor, wherein the spiropyran compound and the HX-donor are distributed through said binder in a solvent, the improvement wherein the spirain fraction of the spiropyran compound is reduced by having an ester means in said solvent in the proportion of at least 10 mols of said ester means to each mol of said HX-donor, the ester means being ethyl acetate.

2. The improvement as claimed in claim 1 wherein said HX-donor comprises 2, 2, 2-tribromoethanol.

3. The improvement as claimed in claim 1, wherein said binder comprises polymethylmethacrylate.

4. The improvement as claimed in claim 3, wherein said HX-donor comprises 2,2,2-tribromoethanol.

* * * * *